(12) United States Patent
Kumakawa et al.

(10) Patent No.: US 11,227,725 B2
(45) Date of Patent: Jan. 18, 2022

(54) SOLID ELECTROLYTIC CAPACITOR INCLUDING A PLURALITY OF CAPACITOR ELEMENTS AND METHOD FOR PRODUCING THE SAME

(71) Applicant: Panasonic Intellectual Property Management Co., Ltd., Osaka (JP)

(72) Inventors: Takahiro Kumakawa, Kyoto (JP); Renki Yamazaki, Osaka (JP); Shinya Suzuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/710,694

(22) Filed: Dec. 11, 2019

(65) Prior Publication Data

US 2020/0194187 A1 Jun. 18, 2020

(30) Foreign Application Priority Data

Dec. 12, 2018 (JP) .............................. JP2018-232340

(51) Int. Cl.
*H01G 9/012* (2006.01)
*H01G 9/025* (2006.01)
*H01G 9/04* (2006.01)
*H01G 9/07* (2006.01)

(52) U.S. Cl.
CPC ............. *H01G 9/012* (2013.01); *H01G 9/025* (2013.01); *H01G 9/04* (2013.01); *H01G 9/07* (2013.01)

(58) Field of Classification Search
CPC ............ H01G 9/15; H01G 9/025; H01G 9/04; H01G 9/07; H01G 9/012
See application file for complete search history.

(56) References Cited

U.S. PATENT DOCUMENTS

| 4,093,972 A * | 6/1978 | Voyles ................... H01G 9/012 361/540 |
| 5,390,074 A * | 2/1995 | Hasegawa ................ H01G 9/15 361/540 |
| 6,259,348 B1 * | 7/2001 | Kuriyama ............ H01G 9/0003 337/232 |

(Continued)

FOREIGN PATENT DOCUMENTS

| EP | 0024302 A2 * | 3/1981 | ........... H01G 9/0029 |
| EP | 0227527 A1 * | 7/1987 | ........... H01G 13/003 |

(Continued)

*Primary Examiner* — David M Sinclair
(74) *Attorney, Agent, or Firm* — Wenderoth, Lind & Ponack, L.L.P.

(57) ABSTRACT

A solid electrolytic capacitor having high reliability while maintaining suitable electrical characteristics, and a method for producing the same. The solid electrolytic capacitor includes a plurality of capacitor elements, an exterior body covering the plurality of capacitor elements, a contact layer metallic bonded to an anode terminal portion that is an end portion of the anode body, an anode-side electrode layer provided so as to cover the contact layer, a cathode-side electrode layer electrically connected to the cathode body, an anode-side external electrode provided on the surface of the anode-side electrode layer, and a cathode-side external electrode provided on the surface of the cathode-side electrode layer.

10 Claims, 5 Drawing Sheets

(56) References Cited

U.S. PATENT DOCUMENTS

| | | | |
|---|---|---|---|
| 6,541,302 B2* | 4/2003 | Huber | H01G 13/006 |
| | | | 438/106 |
| 7,085,127 B2* | 8/2006 | Goldberger | H01G 9/012 |
| | | | 361/523 |
| 10,879,011 B2* | 12/2020 | Furukawa | H01G 9/26 |
| 2002/0001169 A1* | 1/2002 | Shiraishi | H01G 9/012 |
| | | | 361/523 |
| 2003/0026064 A1 | 2/2003 | Nakada et al. | |
| 2004/0264111 A1* | 12/2004 | Shimoyama | H01G 9/012 |
| | | | 361/523 |
| 2010/0079930 A1 | 4/2010 | Hayashi et al. | |
| 2010/0091431 A1 | 4/2010 | Ito | |
| 2010/0165547 A1* | 7/2010 | Kuranuki | H01G 9/15 |
| | | | 361/525 |
| 2011/0222209 A1 | 9/2011 | Ohyama | |
| 2017/0140877 A1* | 5/2017 | Kuromi | H01G 9/10 |
| 2017/0316890 A1 | 11/2017 | Zhi et al. | |
| 2017/0365419 A1* | 12/2017 | Demizu | H01G 9/012 |

FOREIGN PATENT DOCUMENTS

| | | |
|---|---|---|
| JP | 2003-86459 | 3/2003 |
| JP | 2008-235694 | 10/2008 |
| JP | 2009-76872 | 4/2009 |
| JP | 2009-94474 | 4/2009 |
| JP | 2010-87241 | 4/2010 |
| WO | 2010/058534 | 5/2010 |

\* cited by examiner

SOLID ELECTROLYTIC CAPACITOR INCLUDING A PLURALITY OF CAPACITOR ELEMENTS AND METHOD FOR PRODUCING THE SAME

CROSS REFERENCE TO RELATED APPLICATIONS

This application is entitled and claims the benefit of Japanese Patent Application No. 2018-232340, filed on Dec. 12, 2018, the disclosure of which including the specification, drawings and abstract is incorporated herein by reference in its entirety.

TECHNICAL FIELD

The present disclosure relates to a solid electrolytic capacitor, and a method for producing the same.

BACKGROUND ART

There is a demand for capacitors having an excellent impedance characteristic in a high-frequency region in accordance with development of high frequency electronic devices. To meet this demand, various solid electrolytic capacitors using a conductive polymer having high electrical conductivity as a solid electrolyte are studied (see, for example, Patent Literature (hereinafter, referred to as PTL) 1).

In recent years, downsizing and increasing in capacity are strongly desired for a solid electrolytic capacitor used in the vicinity of a CPU (central processing unit) of a personal computer and the like. In addition, low ESR (equivalent series resistance) corresponding to high frequency, low ESL (equivalent series inductance) excellent in noise removal and transient response, and the like are required. Various studies are performed for satisfying these requirements.

Figure 3A:
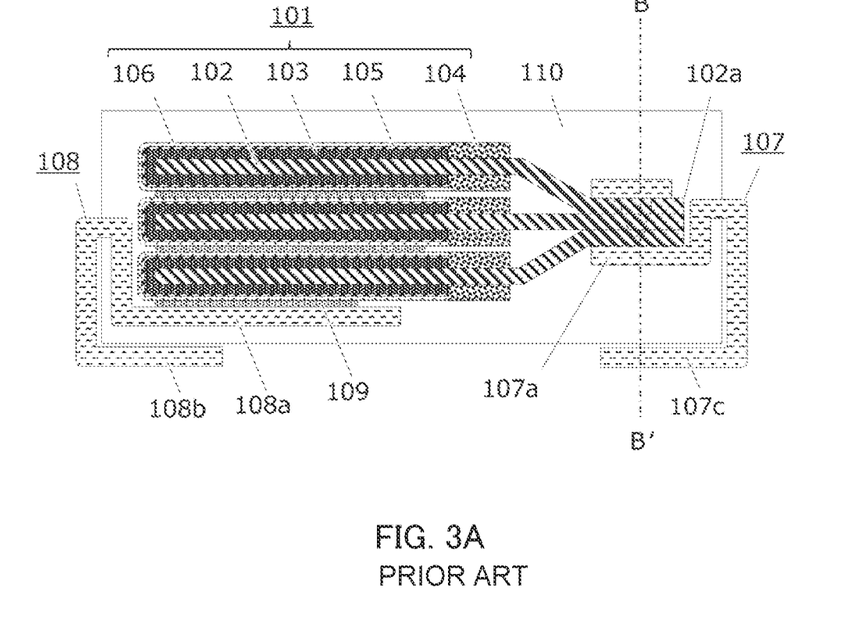
FIG. 3A is a front cross-sectional view illustrating a configuration of a solid electrolytic capacitor of PTL 1.
Figure 3B:
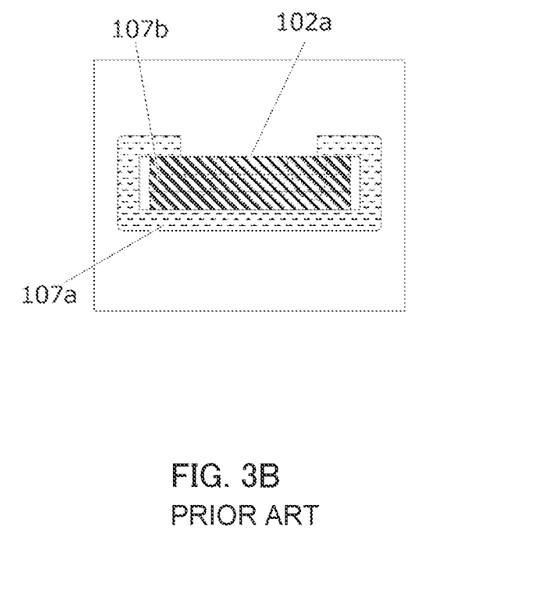
FIG. 3B is a cross-sectional view taken along line B-B' of FIG. 3A.

A multilayer solid electrolytic capacitor disclosed in PTL 1 will be described with reference to FIGS. 3A and 3B. FIG. 3A is a front cross-sectional view of the solid electrolytic capacitor disclosed in PTL 1. FIG. 3B is a cross-sectional view (side cross-sectional view) taken along line B-B' of FIG. 3A.

As illustrated in FIG. 3A, capacitor element 101 includes anode body 102, dielectric oxide layer 103, resist portion 104, solid electrolyte layer 105, cathode layer 106, and anode electrode portion 102a.

Anode body 102 is composed of Al (aluminum) foil.

Dielectric oxide layer 103 is formed by roughening the Al foil surface of anode body 102.

Resist portion 104 is composed of an insulating material, and electrically insulates and separates anode electrode portion 102a from a cathode electrode portion (not illustrated) composed of cathode layer 106.

Solid electrolyte layer 105 is composed of a polymer material and is formed on dielectric oxide layer 103.

Cathode layer 106 is formed on solid electrolyte layer 105 by sequentially laminating a carbon layer and an Ag (silver) paste layer.

As illustrated in FIG. 3B, inner side 107a of anode comb terminal 107 is subjected to bending processing so as to envelop anode electrode portions 102a stacked and placed on inner side 107a. Tip portion 107b of anode comb terminal 107 and anode electrode portion 102a are joined by laser welding.

A plurality of capacitor elements 101 are stacked and placed on inner side 108a of cathode comb terminal 108. Inner side 108a is joined via conductive adhesive 109 to cathode layer 106 of capacitor element 101 (the bottom capacitor element 101 illustrated in FIG. 3A) located at a position closest to inner side 108a.

Insulating exterior resin 110 covers the plurality of capacitor elements 101. A part of anode comb terminal 107 and a part of cathode comb terminal 108 exposed outside exterior resin 110 are each provided along the outer surface of exterior resin 110 as illustrated in FIG. 3A. End portions of the bent parts of anode comb terminal 107 and cathode comb terminal 108 are both disposed on the underside of exterior resin 110. Therefore, the solid electrolytic capacitor of PTL 1 is a surface-mount solid electrolytic capacitor having anode terminal portion 107c and cathode terminal portion 108b formed on its underside.

In the solid electrolytic capacitor of PTL 1 with the above described configuration, tip portion 107b of anode comb terminal 107 and the plurality of stacked anode electrode portions 102a are welded by radiating laser light from the upper surface side of anode electrode portions 102a illustrated in FIGS. 3A and 3B, thereby realizing stable joining.

However, the solid electrolytic capacitor of PTL 1 requires a region for welding tip portion 107b of anode comb terminal 107 and the plurality of stacked anode electrode portions 102a, and thus is difficult to be downsized.

In addition, the solid electrolytic capacitor of PTL 1 includes anode comb terminal 107 and cathode comb terminal 108 to be subjected to complicated bending processing and the like. The number of parts and assembly steps thus increase, leading to a higher cost.

In the solid electrolytic capacitor of PTL 1, the lead-out distances from capacitor element 101 to anode terminal portion 107c and to cathode terminal portion 108b are increased, and therefore, the reduction of ESL is not unlimited.

In order to solve the above-described problems, PTL 1 proposes a so-called end face current collection structure in which an anode end face is directly connected to an external electrode.

Figure 4A:
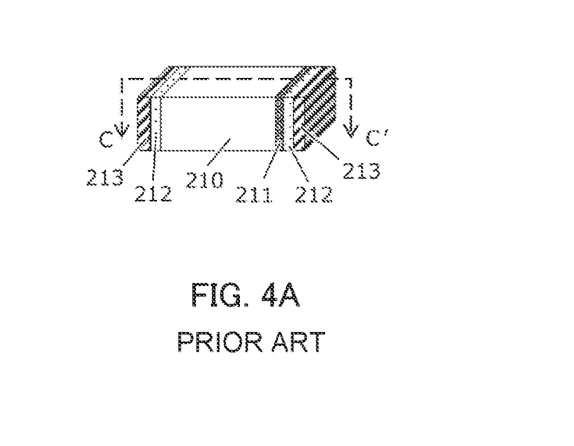
FIG. 4A is a perspective view illustrating a configuration of a solid electrolytic capacitor of PTL 1.
Figure 4B:
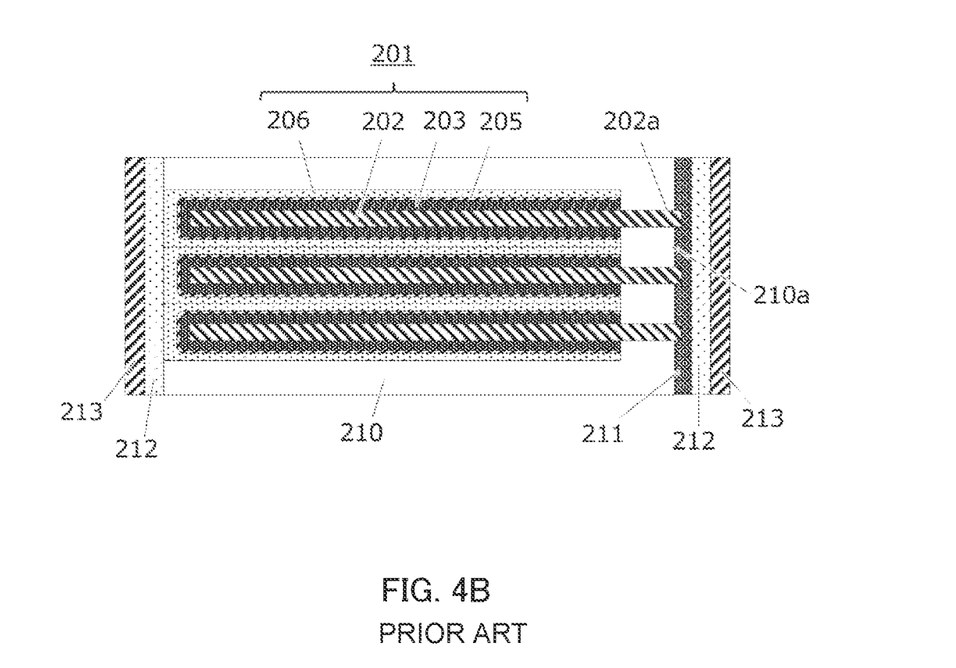
FIG. 4B is a cross-sectional view taken along line C-C' of FIG. 4A.

The end face current collection structure will be described with reference to FIGS. 4A and 4B. FIG. 4A is a perspective view of a solid electrolytic capacitor having an end face current collection structure disclosed in PTL 1. FIG. 4B is a cross-sectional view taken along line C-C' of FIG. 4A.

As illustrated in FIG. 4B, capacitor element 201 includes anode body 202, dielectric oxide layer 203, solid electrolyte layer 205, cathode layer 206, and anode terminal portion 202a.

Anode body 202 is composed of Al foil. Dielectric oxide layer 203 is formed by roughening the Al foil surface of anode body 202.

Solid electrolyte layer 205 is composed of a polymer material and is formed on dielectric oxide layer 203.

Cathode body 206 is formed on solid electrolyte layer 205 by sequentially laminating a carbon layer and an Ag paste layer.

Exterior body 210 is composed of an epoxy resin and includes anode-side end face 210a. Anode-side end face 210a is a surface formed in such a manner that anode terminal portion 202a that is one end face of anode body 202 is exposed.

Intermediate electrode 212 is composed of Ag paste. External electrode 213 is composed of Ni (nickel) plating and Sn (tin) plating.

Base electrode 211 is formed by causing Zn particles to collide with anode terminal portion 202a and anode-side end face 210a of exterior body 210 by using a high-speed particle collision technique.

A Zn layer formed by the high-speed particle collision technique breaks through an Al oxide layer formed on the Al surface of anode electrode portion 202a and is joined to Al constituting anode body 202 with high strength.

The solid electrolytic capacitor having the end face current collection structure of the above described configuration can achieve high contact property and reduction in connection resistance. Therefore, low ESL and significant downsizing become possible.

CITATION LIST

Patent Literature

PTL 1
Japanese Patent Application Laid-Open No. 2009-76872

SUMMARY OF INVENTION

Technical Problem

In the configuration of PTL 1 as illustrated in FIGS. 4A and 4B, base electrode 211 formed by using a high-speed particle collision technique directly contacts anode-side end face 210a of exterior body 210 that is composed of a cured resin.

In general, a cured resin and metal are mechanically joined by the anchor effect. Accordingly, the adhesion between base electrode 211 and anode-side end face 210a of exterior body 210 becomes extremely low in the configuration of PTL 1. Peeling or breaking thus may occur between base electrode 211 and anode-side end face 210a of exterior body 210 due to stress and the like after the mounting of a solid electrolytic capacitor on a printed board.

An object of an aspect of the present disclosure is to provide a solid electrolytic capacitor with high reliability while maintaining suitable electrical characteristics, and a method for producing the same.

Solution to Problem

The solid electrolytic capacitor of the aspect of the present disclosure includes: a plurality of capacitor elements each having an anode body, a dielectric oxide layer provided on a surface of the anode body, a solid electrolyte layer provided on a surface of the dielectric oxide layer, a cathode body provided on a surface of the solid electrolyte layer, and an insulating layer insulating and separating an anode side and a cathode side from each other; an exterior body covering the plurality of capacitor elements; a contact layer metallic bonded to an anode terminal portion that is an end portion of the anode body; an anode-side electrode layer provided so as to cover the contact layer; a cathode-side electrode layer electrically connected to the cathode body; an anode-side external electrode provided on a surface of the anode-side electrode layer; and a cathode-side external electrode provided on a surface of the cathode-side electrode layer.

The method for producing a solid electrolytic capacitor of the aspect of the present disclosure includes: element forming for forming a plurality of capacitor elements each having an anode body and a cathode body; stacking for stacking the plurality of capacitor elements on a supporting base material via a conductive material; sealing for forming an exterior body covering the plurality of capacitor elements; exposing for forming an anode end face where an anode terminal portion is exposed, the anode terminal portion being an end portion of the anode body; contact layer forming for forming a contact layer by causing metal particles to collide with the anode terminal portion at high speed; first electrode forming for forming an anode-side electrode layer that covers the anode end face including the contact layer, and forming a cathode-side electrode layer electrically connected to the cathode body; and second electrode forming for forming an anode-side external electrode that covers the anode-side electrode layer, and forming a cathode-side external electrode that covers the cathode-side electrode layer.

Advantageous Effects of Invention

The present disclosure is capable of providing a solid electrolytic capacitor with high reliability while maintaining suitable electrical characteristics.

DESCRIPTION OF EMBODIMENTS

Hereinafter, embodiments of the present disclosure will be described with reference to the drawings. In addition, the same symbol is given to each component common in drawings, and the description for the component is omitted suitably.

<Overall Configuration>

Figure 1A:
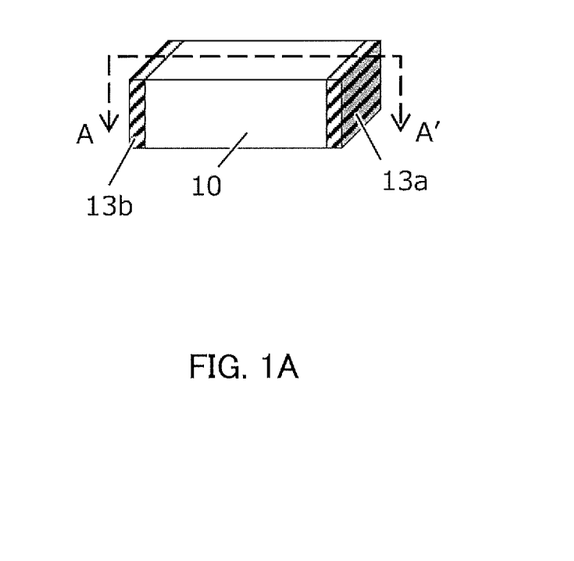
FIG. 1A is a perspective view illustrating a configuration of a solid electrolytic capacitor according to an embodiment of the disclosure.
Figure 1B:
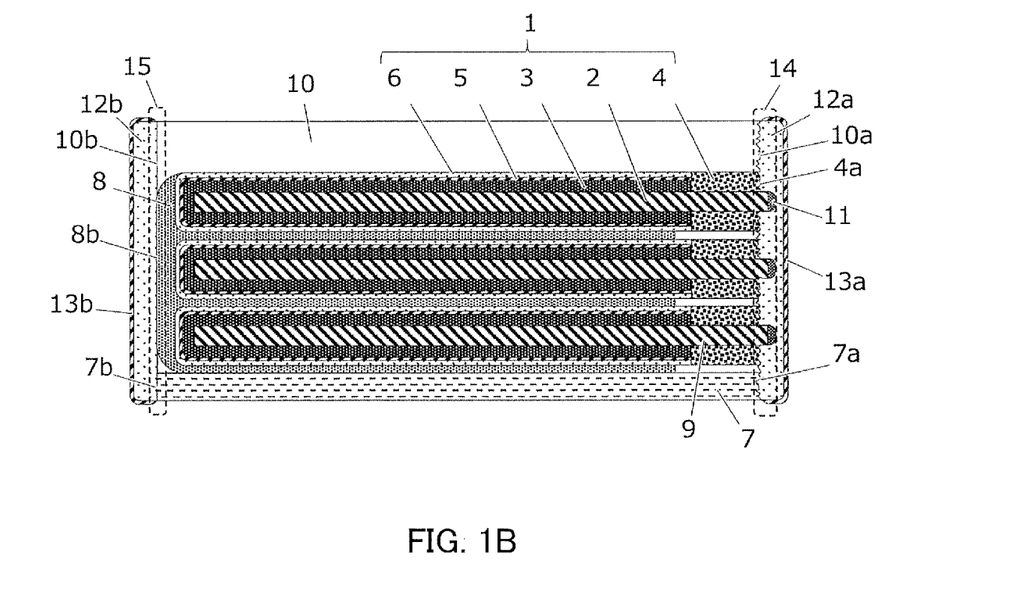
FIG. 1B is a cross-sectional view taken along line A-A' of FIG. 1A.

A configuration of a solid electrolytic capacitor according to an embodiment of the disclosure will be described with reference to FIGS. 1A and 1B. FIG. 1A is a perspective view illustrating the solid electrolytic capacitor according to the present embodiment. FIG. 1B is a cross-sectional view taken along line A-A' of FIG. 1A.

As illustrated in FIGS. 1A and 1B, the solid electrolytic capacitor of the present embodiment includes capacitor element(s) 1, supporting member 7, conductive material 8, anode terminal portion(s) 9, exterior body 10, contact layer(s) 11, anode-side electrode layer 12a, cathode-side electrode layer 12b, anode-side external electrode 13a, cathode-side external electrode 13b, anode end face 14 and cathode end face 15.

As illustrated in FIG. 1B, capacitor element 1 includes anode body (also referred to as a positive electrode) 2, dielectric oxide layer 3, insulating layer 4, solid electrolyte layer 5, and cathode body 6.

Contact layer 11 is formed on the surface of anode terminal portion 9. Anode-side electrode layer 12a is formed so as to cover at least contact layer 11.

Anode-side external electrode 13a and cathode-side external electrode 13b are formed on the surfaces of anode-side electrode layer 12a and cathode-side electrode layer 12b, respectively.

Hereinafter, anode-side external electrode 13a and cathode-side external electrode 13b are also referred to as "external electrode 13a" and "external electrode 13b," respectively. In addition, anode-side electrode layer 12a and cathode-side electrode layer 12b are also referred to as "electrode layer 12a" and "electrode layer 12b," respectively.

Details of anode end face 14 and cathode end face 15 will be described below.

<Capacitor Element 1>

Dielectric oxide layer 3 is obtained, for example, by forming a porous layer on both surfaces of foil of Al that is a valve metal by a method such as chemical etching, and then forming a dielectric film on the porous layer.

Anode body 2 is a remaining core material portion of the Al foil that does not become porous. This anode body 2 is enveloped in dielectric oxide layer 3. That is, dielectric oxide layer 3 is disposed on both surfaces (upper surface and lower surface) of anode body 2.

The thicknesses of anode body 2 and dielectric oxide layer 3 are each 20 to 80 μm. The material of anode body 2 and dielectric oxide layer 3 is not limited to Al foil, and may be, for example, Ta (tantalum) generally used as a capacitor material.

Insulating layer 4 is formed on anode terminal portion 9 that is the end portion of anode body 2, thereby electrically insulating and separating an anode side and a cathode side.

Methods for forming insulating layer 4 are not particularly limited and include, for example, a method in which, after a part of dielectric oxide layer 3 is completely removed by laser or chemical etching, anode body 2 is coated with, for example, polyimide that is an insulating resin. Alternatively, for example, insulating layer 4 may be formed by using a method in which a compressive stress is applied to dielectric oxide layer 3 so that dielectric oxide layer 3 becomes a dense layer to have an insulating property, or a method in which a part of porous dielectric oxide layer 3 is impregnated with an insulating resin.

Further, FIG. 1 illustrates insulating layer 4 in a single structure as an example, but insulating layer 4 may be a composite structure having different materials combined. For example, insulating layer 4 may be a laminated structure of a dense Al oxide film and polyimide resin.

Solid electrolyte layer 5 is formed on dielectric oxide layer 3 that is insulated and separated by insulating layer 4 to be on the cathode side. Solid electrolyte layer 5 is composed of, for example, a conductive polymer material such as polypyrrole or polythiophene. In general, solid electrolyte layer 5 is formed by a method such as chemical polymerization or electrolytic polymerization.

Cathode body 6 is formed on solid electrolyte layer 5. Cathode body 6 is formed by sequentially laminating a carbon layer and an Ag paste layer by, for example, a printing method or a transfer method.

Cathode body 6 is not limited to the laminated structure of the carbon layer and Ag paste layer. For example, cathode body 6 may include conductive paste using a filler other than Ag, or a sintering material in place of the Ag paste. An example of the conductive paste is Cu (copper) paste.

<Stacking of Capacitor Element 1>

A plurality of capacitor elements 1 are stacked on supporting member 7 via conductive material 8. Capacitor element 1 is sealed with exterior body 10 in such a manner that anode terminal portion 9 where the end portion of anode body 2 is exposed is configured. FIG. 1 illustrates three stacked capacitor elements 1 as an example, but the number of stacked capacitor elements 1 is not limited to three.

Supporting member 7 is, for example, a glass epoxy substrate. Also, a substrate having excellent heat resistance such as a substrate of BT resin or polyimide resin, a lead frame made of Cu, or the like can be used. When a conductive material such as a lead frame is used, it is naturally necessary to separate the anode side and the cathode side to be insulated from each other.

For example, conductive paste such as Ag paste is used for conductive material 8. Conductive material 8 is electrically connected to the cathode body of capacitor element 1.

FIG. 1 illustrates single conductive material 8 provided between adjacent capacitor elements 1 as an example, but metal foil of Al, Cu, In (indium) or the like may be provided between capacitor elements 1 in addition to conductive material 8, for example.

<Structure of Anode Terminal Portion 9>

Contact layer 11 composed of a metal having a smaller ionization tendency than anode body 2 is formed on anode terminal portion 9. This contact layer 11 is not formed on exterior body 10 or insulating layer 4 (both of which are resin-based materials), but is selectively formed only on the surface of anode terminal portion 9 composed of a metal material.

When anode body 2 is Al, it is preferable to use a metal having a smaller ionization tendency than Al as the material of contact layer 11. Examples of such metals include Zn (zinc), Ni, Sn, Cu, and Ag. Such a metal can suppress the forming of a strong oxide film on the surface of contact layer 11, and ensure a firm electrical connection between contact layer 11 and electrode layer 12a.

In addition, when anode body 2 is Al, using Cu, Zn, or Ag, which has an interatomic distance similar to that of Al, as a material for contact layer 11 forms an alloy layer by an intermetallic bond with Al. The joining strength between anode bodies 2 thus can be further strengthened. Contact layer 11 may be composed of not only a single element metal, but also an alloy such as bronze or brass, or laminations of Cu, Ag and the like.

<Structure of Electrode>

Anode end face 14 is composed of contact layer 11, anode-side end face 4a of insulating layer 4, anode-side end face 10a of exterior body 10, and anode-side end face 7a of supporting member 7.

Cathode end face 15 is composed of cathode terminal portion 8b that is a cathode-side end face of conductive material 8, cathode-side end face 10b of exterior body and cathode-side end face 7b of supporting member 7.

Anode end face 14 and cathode end face 15 are covered with electrode layers 12a and 12b, respectively. Electrical conduction between anode terminal portions 9 of stacked capacitor elements 1 is enabled mainly via anode-side electrode layer 12a.

Electrode layers 12a and 12b are covered with external electrodes 13a and 13b, respectively.

The material of electrode layers 12a and 12b is preferably a conductive paste material (conductive resin material) having a metal filler (metal particles) such as Ag or Cu mixed in a resin material that is to become a binder. Accordingly, a binder component suitable for adhesion to materials that constitute, for example, insulating layer 4, exterior body 10 and supporting member 7 can be added to the resin, and bonding by chemical bonding or hydrogen bonding can be expected.

For each of anode-side end face 4a of insulating layer 4, anode-side end face 10a and cathode-side end face 10b of exterior body 10, and anode-side end face 7a and cathode-side end face 7b of supporting member 7, the surface roughness Ra is preferably 5 micrometers or more. Such a configuration can increase the contact area between each end face and electrode layer 12a or electrode layer 12b, and also give a bond by the anchor effect.

External electrodes 13a and 13b are, for example, a laminated structure of a Ni layer and a Sn layer. In addition, the material of external electrodes 13a and 13b may preferably be a metal whose outer surface has excellent wettability with solder. Examples of such metals include Sn, Au (gold), Ag, and Pd (palladium).

<Production Method>

Hereinafter, a method for producing a solid electrolytic capacitor of the present embodiment will be described with reference to FIGS. 2A to 2F. Each of FIGS. 2A to 2F is a cross-sectional view of a solid electrolytic capacitor during each step of the method for producing the solid electrolytic capacitor.

<Stacking Step>

A stacking step, the first step of the production method, will be described with reference to FIG. 2A.

Figure 2A:
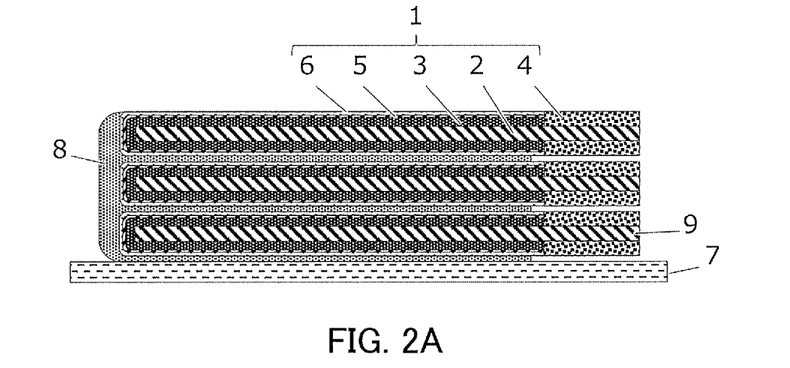
FIG. 2A is a cross-sectional view illustrating the solid electrolytic capacitor during a stacking step according to the embodiment of the disclosure.

Firstly, a plurality of capacitor elements 1 illustrated in FIG. 2A are provided. In this embodiment, three capacitor elements 1 are stacked as an example.

Secondly, an appropriate amount of conductive material 8 is applied on supporting member 7, and first capacitor element 1 is placed thereon with high accuracy.

Thirdly, an appropriate amount of conductive material 8 is applied on first capacitor element 1, and second capacitor element 1 is placed thereon.

Fourthly, an appropriate amount of conductive material 8 is applied on second capacitor element 1, and third capacitor element 1 is placed thereon.

As conductive material 8, thermosetting Ag paste can be used, for example. Examples of methods used for applying conductive material 8 include a dispense method, printing, an ink jet method, a dipping method and a transfer method. Conductive material 8 may be in a form of a sheet capable of adhesion in place of paste.

Lastly, conductive material 8 is thermally cured using a high temperature furnace or the like, and cathode bodies 6 of respective capacitor elements 1 become conductive to each other. The thermosetting means is not limited to a high temperature furnace, and for example, a hot plate or a reflow furnace may also be used.

The solid electrolytic capacitor is thus in the state illustrated in FIG. 2A by the stacking step described above.

In the above description, three capacitor elements 1 are sequentially stacked on one region of supporting member 7 as an example, but capacitor elements 1 may be stacked simultaneously on multiple regions (for example, in a form of a matrix having multiple columns and multiple rows) of supporting member 7.

<Sealing Step>

A sealing step subsequent to the stacking step will be described with reference to FIG. 2B.

Figure 2B:
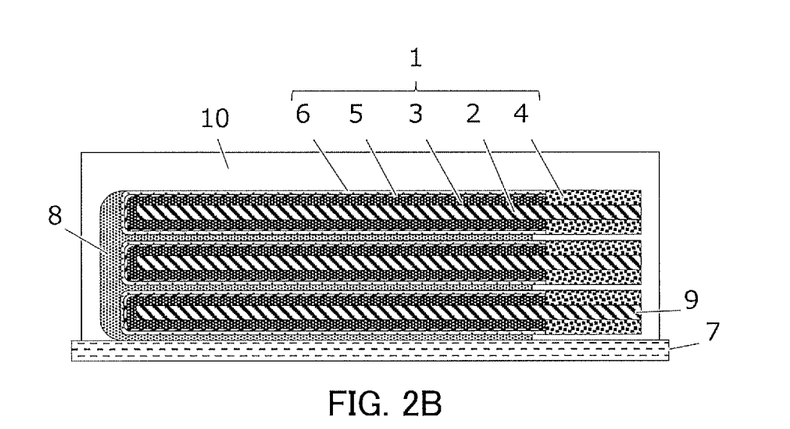
FIG. 2B is a cross-sectional view illustrating the solid electrolytic capacitor during a sealing step according to the embodiment of the disclosure.

As illustrated FIG. 2B, three stacked capacitor elements 1 are sealed with exterior body 10 in such a manner that capacitor elements 1 are covered.

An epoxy resin containing an inorganic filler such as silica is used as exterior body 10, for example. Exterior body 10 also fills the gap between stacked capacitor elements 1 and the gap between supporting member 7 and capacitor element 1. Examples of methods used for the sealing include transfer sealing, compression sealing, and a method in which a liquid resin is poured into a mold and thermally cured thereafter.

<Exposing Step>

Figure 2C:
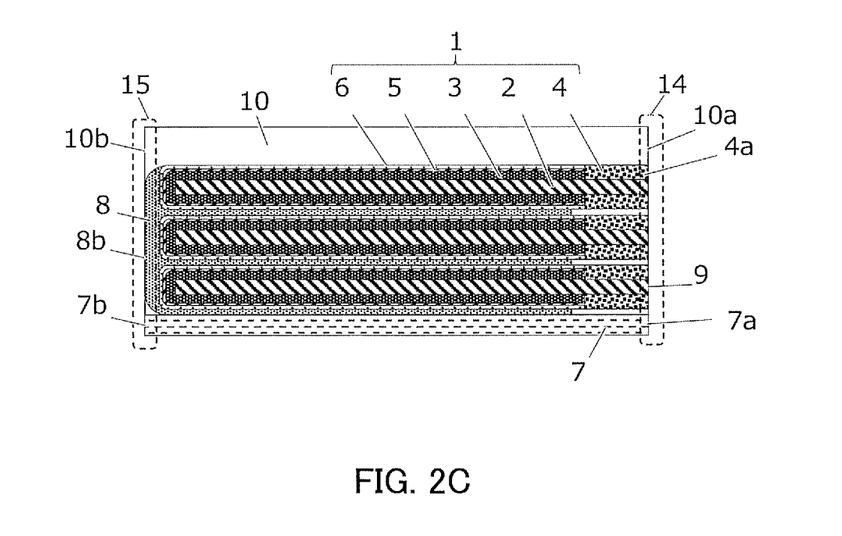
FIG. 2C is a cross-sectional view illustrating the solid electrolytic capacitor during an exposing step according to the embodiment of the disclosure.

An exposing step subsequent to the sealing step will be described with reference to FIG. 2C.

Anode end face 14 and cathode end face 15 are formed for exposing cathode terminal portion 8b and anode terminal portion 9.

An example of the forming method is such that a dicing blade with diamond particles fixed with a bond material is rotated at high speed to perform cutting. When parts of exterior body 10 and supporting member 7 (both end portions in the drawing) illustrated in FIG. 2B are cut by the above method, anode end face 14 and cathode end face are formed as illustrated in FIG. 2C.

Anode end face 14 is mainly composed of anode terminal portions 9, anode-side end face 4a of insulating layer 4, anode-side end face 10a of exterior body 10 and anode-side end face 7a of supporting member 7 at this point.

Cathode end face 15 is mainly composed of cathode terminal portion 8b (that is a cathode-side end face of conductive material 8), cathode-side end face 10b of exterior body and cathode-side end face 7b of supporting member 7 at this point.

<Contact Layer Forming Step>

A contact layer forming step subsequent to the exposing step will be described with reference to FIG. 2D.

Figure 2D:
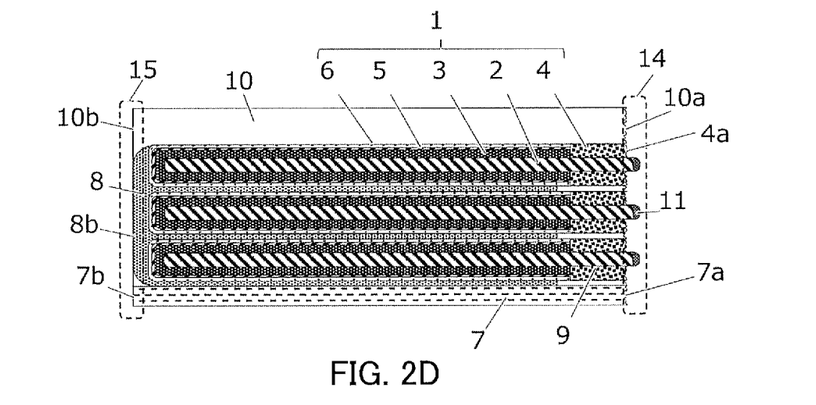
FIG. 2D is a cross-sectional view illustrating the solid electrolytic capacitor during a contact layer forming step according to the embodiment of the disclosure.

As illustrated in FIG. 2D, each of end faces (anode-side end face 4a of insulating layer 4, anode-side end face 10a of exterior body 10 and anode-side end face 7a of supporting member 7) constituting anode end face 14 is roughened. In addition, as illustrated in FIG. 2D, contact layer 11 is formed on the surface of each anode terminal portion 9.

Contact layer 11 is formed, for example, by causing Cu particles to collide with anode terminal portion 9 at a high speed. Cu has a smaller ionization tendency than Al that is a material of anode terminal portion 9, and has an interatomic distance relatively similar to that of Al.

Contact layer 11 is formed by a technique called a cold spray method. The cold spray method accelerates metal particles in the order of several μm to several tens of μm to the range of from subsonic to supersonic by using a compressed gas such as air, nitrogen, or helium to cause the metal particles to collide in the solid state with a base material, thereby forming a metal film.

Although the adhesion mechanism of metal particles in the cold spray method does not become entirely clear, in general, it is considered that metal particles or a metal base material are plastically deformed by the collision energy of the metal particles, thereby exposing a new surface on a metal surface to perform activation.

With the use of the cold spray method, Cu particles colliding with anode terminal portion 9 at high speed break through the oxide film on the Al surface of anode terminal portion 9, thereby forming a metallic bond between Al and Cu. Accordingly, an alloy layer of Al and Cu is formed at the interface between contact layer 11 and anode terminal portion 9. On the surface of contact layer 11, meanwhile, a layer of Cu that is a non-valve action metal is formed. Contact layer 11 therefore contains a metal having a smaller ionization tendency than anode terminal portion 9.

When the cold spray method is performed, Cu particles also collide with each of the end faces composed of non-metallic materials (anode-side end face 4a of insulating layer 4, anode-side end face 10a of exterior body 10 and anode-side end face 7a of supporting member 7).

When a base material (for example, insulating layer 4, exterior body 10 or supporting member 7) on which metal particles collide is a resin base material, the main bond between the metal particles and the resin base material is considered to be mechanical joining due to plastically deformed metal particles cutting into unevenness in the surface of the resin base material. Therefore, for forming a metal film on a resin base material, the following conditions are required: the resin base material has sufficient hardness to efficiently use the collision energy for plastic deformation of the metal particles, a metal material and processing conditions that are more likely to cause plastic deformation of the metal particles are selected, and the resin base material is not easily destroyed by the collision energy.

With the above conditions in mind, epoxy resin generally used as exterior body 10 may have increased hardness as a whole by increasing the mixing ratio of a filler such as silica, but doing so, the ratio of epoxy resin component that becomes a binder decreases, and thus the epoxy resin becomes brittle.

In other words, there are a part where a metal film is formed due to occurrence of sufficient plastic deformation of the metal particles without breaking the resin base material, and at the same time, a part where the resin base material is subjected to brittle fracture and scraped by the collision energy of the metal particles.

Therefore, in order to stably form a metal film having a prescribed thickness or more over the entire surface, a method that increases the film formation processing time, a method that increases the spray amount of metal particles or the like becomes necessary, and thus the productivity significantly decreases.

In addition, although a metal film can be formed over the entire surface, the thickness of the formed metal film varies greatly between anode terminal portion 9 composed of Al that can easily form a film and the exterior body 10 composed of a material such as a resin base material that can be easily scraped. This affects the accuracy of the external shape of the solid electrolytic capacitor.

When the Young's modulus of metal particles is smaller than that of the member constituting a resin base material, plastic deformation of the metal particles tends to be promoted during the collision thereof. In this case, the metal particles tend to be fixed more easily on the resin base material during the formation of a metal film on the resin base material.

On the other hand, for not completely fixing metal particles to a resin base material, the following basic conditions are required: the resin base material is made elastic so that the collision energy is not converted into the energy for plastic deformation, the strength of the resin base material is lowered so that the base material is broken at or below the impact that causes plastic deformation, and a metal material and processing conditions that are less likely cause plastic deformation are selected within a range in which contact layer 11 can be formed on anode terminal portion 9.

That is, by making the Young's modulus of the metal particles (which may be referred to as "contact layer 11") larger than that of the member constituting the resin base material, it is possible to create a state in which fixation is less likely to occur.

For example, when the resin base material is filled with silica having a Young's modulus of 94 GPa, it is preferable to use metal particles (for example, Cu or Ni) which have a higher Young's modulus and are easily joined to Al. However, since the fixation state changes depending on, for example, the shape, size and temperature of the metal particles, and the size and filling rate of silica filling the resin material, the type of metal particles is not limited to the above examples.

In addition, when metal particles are not fixed to the resin base material, the effect of surface roughening can be obtained by causing the metal particles to collide with the resin base material.

FIG. 2D illustrates a case where roughening treatment is not performed on end faces (cathode terminal portion 8b, cathode-side end face 10b, and cathode-side end face 7b) constituting cathode end face 15, but each of end faces constituting cathode end face 15 may be roughened by sandblasting or the like.

<First Electrode Forming Step>

A first electrode forming step subsequent to the contact layer forming step will be described with reference to FIG. 2E.

Figure 2E:
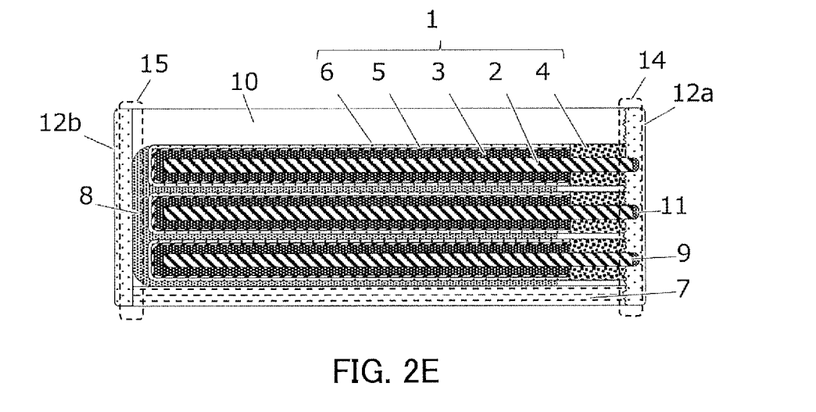
FIG. 2E is a cross-sectional view illustrating the solid electrolytic capacitor during a first electrode forming step according to the embodiment of the disclosure.

As illustrated in FIG. 2E, electrode layers 12a and 12b are formed on anode end face 14 and cathode end face 15, respectively. This configuration electrically connects an anode body to an anode-side electrode layer, and a cathode body to a cathode-side electrode layer.

Specifically, Ag paste is applied to the end faces by a dipping method, a transfer method, a printing method, a dispense method, or the like, and subsequently cured at a high temperature to form electrode layers 12a and 12b, respectively.

Electrode layer 12a may cover a part of a surface orthogonal to anode end face 14 (for example, the upper surface of exterior body 10 and/or the lower surface of supporting member 7). Similarly, electrode layer 12b may cover a part of a surface orthogonal to cathode end face 15 (for example, the upper surface of exterior body 10 and/or the lower surface of supporting member 7).

<Second Electrode Forming Step>

A second electrode forming step subsequent to the first electrode forming step will be described with reference to FIG. 2F.

Figure 2F:
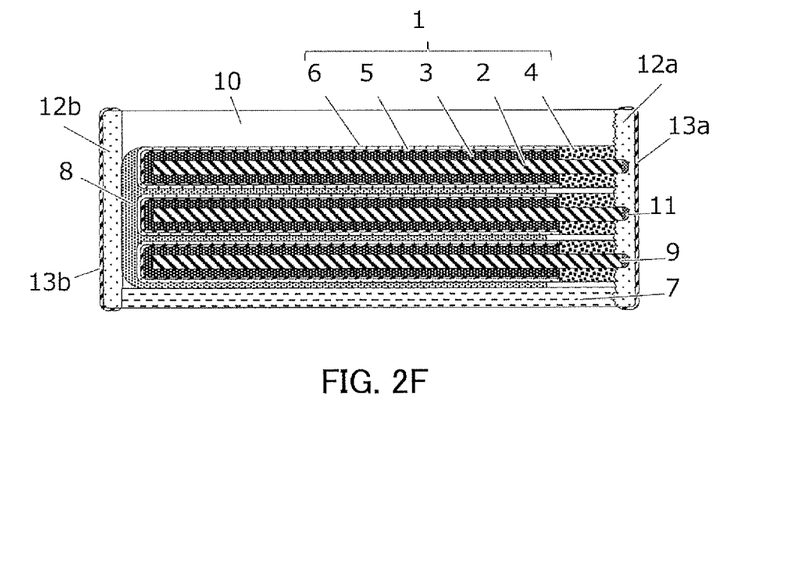
FIG. 2F is a cross-sectional view illustrating the solid electrolytic capacitor during a second electrode forming step according to the embodiment of the disclosure.

As illustrated in FIG. 2F, external electrode 13a is formed on the outer surface of electrode layer 12a and external electrode 13b is formed on the outer surface of electrode layer 12b.

Specifically, external electrodes 13a and 13b are formed by a barrel plating method that is one of electrolytic plating methods. External electrodes 13a and 13b are a laminated structure of Ni and Sn.

External electrodes 13a and 13b may be formed as a structure containing Ag and Sn by the above described cold spray method. Alternatively, external electrodes 13a and 13b may be formed by a combination of the barrel plating method and a solder dipping method.

Alternatively, external electrodes 13a and 13b may be formed by a method in which Cu based caps previously provided with a Sn film is adhered to electrode layers 12a and 12b that are Ag paste (which can function as an adhesive).

<Effect>

Since the solid electrolytic capacitor of the present embodiment has contact layer 11 metallic bonded to (forming a metallic bond with) anode terminal portion 9 composed of valve action metal foil, the solid electrolytic capacitor can secure a low-resistance current path to external electrodes 13a and 13b, thereby maintaining suitable electrical characteristics.

Since anode end face 14 and cathode end face 15 are respectively joined to electrode layers 12a and 12b composed of conductive resin paste excellent in joinability with a resin base material, strong joining can be realized, thereby improving the reliability of the solid electrolytic capacitor.

In addition, as the formation region of contact layer 11 is limited only to anode terminal portion 9, the time required for metal film formation can be greatly reduced. Therefore, the consumption of metal particles can be significantly reduced, and the process time can be shortened, thereby improving the productivity of the solid electrolytic capacitor.

Further, by roughening end faces (anode-side end face 4a of insulating layer 4, anode-side end face 10a of exterior body 10 and anode-side end face 7a of supporting member 7) constituting anode end face 14 simultaneously with the formation of contact layer 11, the adhesion of electrode layers 12a and 12b can be heightened to obtain extremely high reliability without increasing the processing time.

The disclosure is not limited to the description of the above embodiment, and various modifications are possible within the scope and spirit thereof.

INDUSTRIAL APPLICABILITY

The solid electrolytic capacitor of the disclosure has high reliability and productivity while maintaining suitable electrical characteristics, and thus is useful as a capacitor in various fields such as electronic devices (for example, personal computers and mobile terminals), industrial devices, and in-vehicle devices.

REFERENCE SIGNS LIST

1 Capacitor element
2 Anode body
3 Dielectric oxide layer
4 Insulating layer
4a Anode-side end face of insulating layer 4
5 Solid electrolyte layer
6 Cathode body
7 Supporting member
7a Anode-side end face of supporting member 7
7b Cathode-side end face of supporting member 7
8 Conductive material
8b Cathode terminal portion
9 Anode terminal portion
10 Exterior body
10a Anode-side end face of exterior body 10
10b Cathode-side end face of exterior body 10
11 Contact layer
12a Anode-side electrode layer
12b Cathode-side electrode layer
13a Anode-side external electrode
13b Cathode-side external electrode
14 Anode end face
15 Cathode end face
101 Capacitor element
102 Anode body
102a Anode electrode portion
103 Dielectric oxide layer
104 Resist portion
105 Solid electrolyte layer
106 Cathode layer
107 Anode comb terminal
107a Inner side of anode comb terminal 107
107b Tip portion of anode comb terminal 107
107c Anode terminal portion
108 Cathode comb terminal
108a Inner side of cathode comb terminal 108
108b Cathode terminal portion
109 Conductive adhesive
110 Exterior resin
201 Capacitor element
202 Anode body
202a Anode terminal portion
203 Dielectric oxide
205 Solid electrolyte layer
206 Cathode layer
210 Exterior body
210a Anode-side end face of exterior body 210
211 Base electrode
212 Intermediate electrode
213 External electrode

The invention claimed is:

1. A solid electrolytic capacitor comprising:
   a plurality of capacitor elements each having an anode body, a dielectric oxide layer provided on a surface of the anode body, a solid electrolyte layer provided on a surface of the dielectric oxide layer, a cathode body provided on a surface of the solid electrolyte layer, and an insulating layer insulating and separating an anode side and a cathode side from each other;
   an exterior body covering the plurality of capacitor elements;
   a contact layer metallic bonded only to an anode terminal portion that is an end portion of the anode body;
   an anode-side electrode layer electrically connected to the anode terminal portion;
   a cathode-side electrode layer electrically connected to the cathode body;
   an anode-side external electrode provided on a surface of the anode-side electrode layer; and
   a cathode-side external electrode provided on a surface of the cathode-side electrode layer, wherein
   the anode terminal portion penetrates into the anode-side electrode layer, and
   a material of the anode-side electrode layer is a conductive resin material having first metal particles mixed in a resin material.

2. The solid electrolytic capacitor according to claim 1, wherein:
   each of the exterior body and the insulating layer, which are to be covered with the anode-side electrode layer, has surface roughness Ra of 5 micrometers or more.

3. The solid electrolytic capacitor according to claim 1, wherein: the contact layer is formed by causing second metal particles to collide with the anode terminal portion at high speed.

4. The solid electrolytic capacitor according to claim 3, wherein: the second metal particles are plastically deformed in the contact layer.

5. The solid electrolytic capacitor according to claim 1, wherein:
   an alloy layer is formed between the contact layer and the anode terminal portion; and
   the alloy layer is the alloy layer of the metal of the contact layer and the metal of the anode terminal portion.

6. The solid electrolytic capacitor according to claim 1, wherein:
   the contact layer includes a metal having a smaller ionization tendency than the anode body.

7. The solid electrolytic capacitor according to claim 1, wherein:
   the contact layer has larger Young's modulus than a member or members constituting the exterior body and the insulating layer.

8. The solid electrolytic capacitor according to claim 7, wherein:
   a part of the anode terminal portion protrudes from the exterior body.

9. The solid electrolytic capacitor according to claim 1, wherein:
   an alloy layer is formed at an interface between the contact layer and the anode electrode portion.

10. The solid electrolytic capacitor according to claim 1, wherein:
    the contact layer is formed selectively on the anode terminal portion.

* * * * *